(12) United States Patent
Kovalevich et al.

(10) Patent No.: US 8,202,073 B1
(45) Date of Patent: Jun. 19, 2012

(54) HANDHELD HAMBURGER PATTY FORMING SYSTEM

(76) Inventors: Paul R. Kovalevich, Clearwater Beach, FL (US); Linda M. Boni, Clearwater Beach, FL (US)

( * ) Notice: Subject to any disclaimer, the term of this patent is extended or adjusted under 35 U.S.C. 154(b) by 25 days.

(21) Appl. No.: 12/803,116

(22) Filed: Jun. 18, 2010

(51) Int. Cl.
*A21C 11/18* (2006.01)
*B29C 43/04* (2006.01)

(52) U.S. Cl. ......... 425/87; 425/318; 425/355; 425/454; 426/512; 426/518

(58) Field of Classification Search ............ 425/87, 425/318, 352, 355, 454, DIG. 57; 426/512, 426/518
See application file for complete search history.

(56) References Cited

U.S. PATENT DOCUMENTS

| | | | |
|---|---|---|---|
| 1,069,509 A * | 8/1913 | Winn | 425/292 |
| 1,757,447 A * | 5/1930 | Comstock | 425/89 |
| 2,219,889 A * | 10/1940 | Federighi et al. | 425/89 |
| 2,837,761 A * | 6/1958 | Stiegler | 249/74 |
| 4,436,499 A * | 3/1984 | Ferrighi | 425/195 |
| 4,765,029 A * | 8/1988 | Rogan | 425/444 |
| 7,247,011 B2 * | 7/2007 | St. Germain et al. | 425/87 |
| 7,331,776 B2 * | 2/2008 | Errera | 425/298 |

* cited by examiner

*Primary Examiner* — Richard Crispino
*Assistant Examiner* — Thukhanh Nguyen

(57) ABSTRACT

A housing has a cylindrical side wall with an upper end and an open lower end. A circular disk with an aperture closes the upper end. A circular pusher plate is reciprocable within the housing between a raised orientation adjacent to the circular disk and a lowered orientation. A drive rod has lower and upper ends and a central extent extending through the aperture. The upper end is spaced above the disk. The drive rod has threads at its upper end and a nut removably coupled to the upper end. A handle has an interior end attached to the housing. The handle has an exterior end extending away from the housing. A coil spring encompasses the central extent of the drive rod. The bottom end of the spring contacts the disk. The top end of the spring contacts the nut.

3 Claims, 2 Drawing Sheets

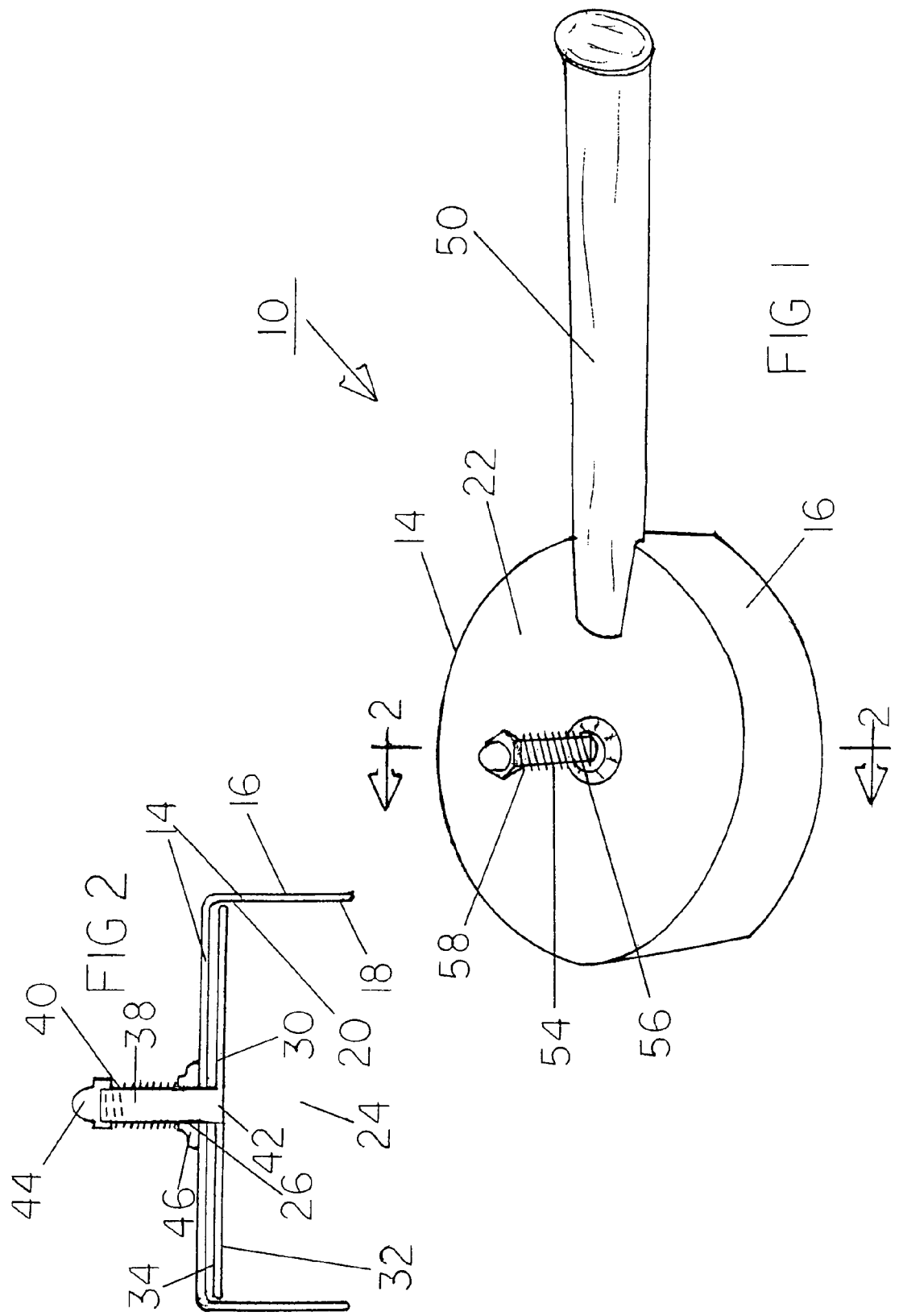

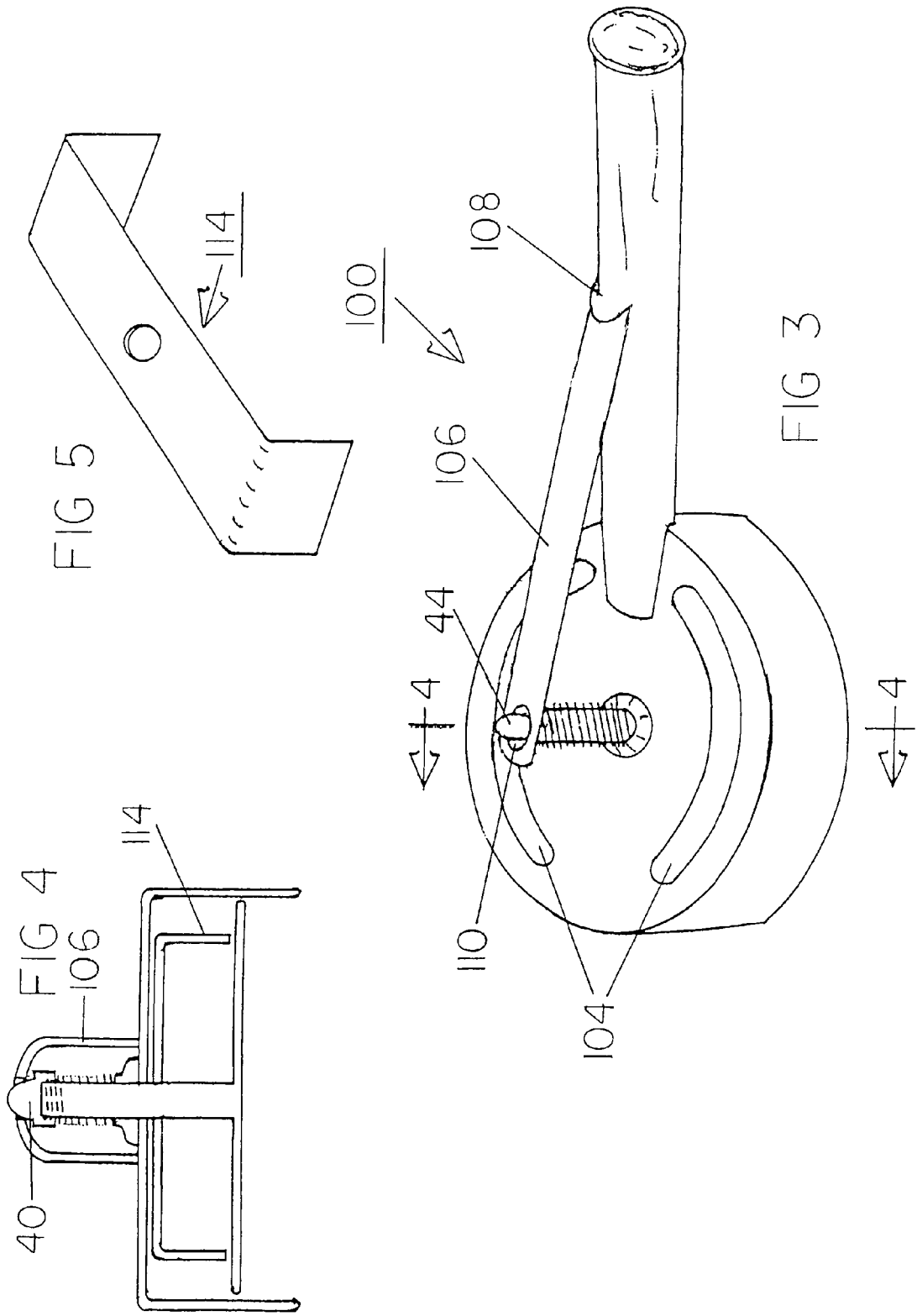

HANDHELD HAMBURGER PATTY FORMING SYSTEM

BACKGROUND OF THE INVENTION

Field of the Invention

The present invention relates to a handheld hamburger patty forming system and more particularly pertains to shaping ground meat into perfectly formed patties, the shaping being done in a sanitary, convenient, repeatable and economical manner.

SUMMARY OF THE INVENTION

In view of the foregoing disadvantages inherent in the known types of forming systems of known designs and configurations now present in the prior art, the present invention provides an improved handheld hamburger patty forming system. As such, the general purpose of the present invention, which will be described subsequently in greater detail, is to provide a new and improved handheld hamburger patty forming system and method which has all the advantages of the prior art and none of the disadvantages.

To attain this, the present invention essentially comprises a handheld hamburger patty forming system. First provided is a housing. The housing has a cylindrical side wall. The side wall has an open lower end. The side wall has an upper end. A flat circular disk is provided. The disk closes the upper end. The housing has a chamber. The chamber is provided within the side wall. The chamber is bounded by the upper and lower ends. The disk has a central aperture.

A circular pusher plate is provided. The pusher plate has a lower surface. The pusher plate has an upper surface. The pusher plate is rigid. The pusher plate has a thickness of between 0.25 inches and 0.125 inches. The pusher plate has a diameter of between 3.75 inches and 3.875 inches. The pusher plate is positioned within the chamber. In this manner reciprocal movement between a raised orientation and a lowered orientation is provided. In the raised orientation the upper surface is provided adjacent to the circular disk. In the lowered orientation the lower surface is provided co-planar with the lower end of the housing. The chamber is provided between the lower end of the side wall and the pusher plate. The chamber has a diameter of 4.0 inches, plus or minus 10 percent. The chamber has an axial length of 1.0 inch, plus or minus 10 percent.

Provided next is a drive rod. The drive rod has an upper end. The drive rod has a lower end. The drive rod has a central extent. The central extent extends through the aperture of the circular disk. The lower end of the drive rod is coupled to the upper surface of the pusher plate. The upper end of the drive rod is threaded and spaced above the circular disk. An acorn nut is provided. The acorn nut is removably coupled to the threaded upper end of the drive rod.

Further provided is a handle. The handle has an interior end. The interior end of the handle is attached to the housing. The handle has an exterior end. The exterior end of the handle extends away from the housing. The exterior end of the handle is adapted to be held by a user during operation and use.

Provided last is a coil spring. The coil spring encompasses the central extent of the drive rod. The coil spring has a bottom end. The bottom end is provided adjacent to the circular disk. The coil spring has a top end. The top end contacts the acorn nut. The coil spring urges the pusher plate to the raised orientation. In this manner the chamber is adapted to be filled with ground meat formed into a half pound hamburger patty. The hamburger patty is about 4 inches in diameter. The hamburger patty is about 1 inch high. The acorn nut is adapted to be pushed by the user. In this manner the pusher plate is moved to the lowered orientation. Further in this manner a perfectly formed half pound hamburger patty is ejected and ready for cooking.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved handheld hamburger patty forming system which has all of the advantages of the prior art forming systems of known designs and configurations and none of the disadvantages.

It is another object of the present invention to provide a new and improved handheld hamburger patty forming system which may be easily and efficiently manufactured and marketed.

It is further object of the present invention to provide a new and improved handheld hamburger patty forming system which is of durable and reliable constructions.

An even further object of the present invention is to provide a new and improved handheld hamburger patty forming system which is susceptible of a low cost of manufacture with regard to both materials and labor, and which accordingly is then susceptible of low prices of sale to the consuming public, thereby making such handheld hamburger patty forming system economically available to the buying public.

Even still another object of the present invention is to provide a handheld hamburger patty forming system for shaping ground meat into perfectly formed patties, the shaping being done in a sanitary, convenient, repeatable and economical manner.

Lastly, it is an object of the present invention to provide a new and improved handheld hamburger patty forming system. A housing has a cylindrical side wall with an upper end and an open lower end. A circular disk closes the upper end. The disk has a central aperture. A circular pusher plate is reciprocable within the housing between a raised orientation adjacent to the circular disk and a lowered orientation. A drive rod has lower and upper ends and a central extent extending through the aperture. The upper end is spaced above the disk. The drive rod has threads at its upper end and a nut removably coupled to the upper end. A handle has an interior end attached to the housing. The handle has an exterior end extending away from the housing. A coil spring encompasses the central extent of the drive rod. The bottom end of the spring contacts the disk. The top end of the spring contacts the nut.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective illustration of a handheld hamburger patty forming system constructed in accordance with the principles of the present invention.

FIG. 2 is a cross sectional view taken along line 2-2 of FIG. 1.

FIG. 3 is a perspective illustration of a handheld hamburger patty forming system constructed in accordance with an alternate embodiment of the invention.

FIG. 4 is a cross sectional view taken along line 4-4 of FIG. 3.

FIG. 5 is a perspective illustration of the spacer shown in FIG. 4.

The same reference numerals refer to the same parts throughout the various Figures.

DESCRIPTION OF THE PREFERRED EMBODIMENT

With reference now to the drawings, and in particular to FIG. 1 thereof, the preferred embodiment of the new and improved handheld hamburger patty forming system embodying the principles and concepts of the present invention and generally designated by the reference numeral 10 will be described.

The present invention, the handheld hamburger patty forming system 10 is comprised of a plurality of components. Such components in their broadest context include a housing, a circular disk, a circular pusher plate, a drive rod, a handle and a coil spring. Such components are individually configured and correlated with respect to each other so as to attain the desired objective.

First provided is a housing 14. The housing has a cylindrical side wall 16. The side wall has an open lower end 18. The side wall has an upper end 20. A flat circular disk 22 is provided. The disk closes the upper end. The housing has a chamber 24. The chamber is provided within the side wall. The chamber is bounded by the upper and lower ends. The disk has a central aperture 26.

A circular pusher plate 30 is provided. The pusher plate has a lower surface 32. The pusher plate has an upper surface 34. The pusher plate is rigid. The pusher plate has a thickness of between 0.25 inches and 0.125 inches. The pusher plate has a diameter of between 3.75 inches and 3.875 inches. The pusher plate is positioned within the chamber. In this manner reciprocal movement between a raised orientation and a lowered orientation is provided. In the raised orientation the upper surface is provided adjacent to the circular disk. In the lowered orientation the lower surface is provided co-planar with the lower end of the housing. The chamber is provided between the lower end of the side wall and the pusher plate. The chamber has a diameter of 4.0 inches, plus or minus 10 percent. The chamber has an axial length of 1.0 inch, plus or minus 10 percent.

Provided next is a drive rod 38. The drive rod has an upper end 40. The drive rod has a lower end 42. The drive rod has a central extent. The central extent extends through the aperture of the circular disk. The lower end of the drive rod is coupled to the upper surface of the pusher plate. The upper end of the drive rod is threaded and spaced above the circular disk. An acorn nut 44 is provided. The acorn nut is removably coupled to the threaded upper end of the drive rod.

Further provided is a handle 50. The handle has an interior end. The interior end of the handle is attached to the housing. The handle has an exterior end. The exterior end of the handle extends away from the housing. The exterior end of the handle is adapted to be held by a user during operation and use.

Provided last is a coil spring 54. The coil spring encompasses the central extent of the drive rod. The coil spring has a bottom end 56. The bottom end is provided adjacent to the circular disk. The coil spring has a top end 58. The top end contacts the acorn nut. The coil spring urges the pusher plate to the raised orientation. In this manner the chamber is adapted to be filled with ground meat formed into a half pound hamburger patty. The hamburger patty is about 4 inches in diameter. The hamburger patty is about 1 inch high. The acorn nut is adapted to be pushed by the user. In this manner the pusher plate is moved to the lowered orientation. Further in this manner a perfectly formed half pound hamburger patty is ejected and ready for cooking.

Reference is now made to the alternate embodiment 100 of the invention illustrated in FIGS. 3, 4 and 5. The central aperture has openings 104. In this manner the weight and cost are reduced. Further in this manner cleaning is facilitated.

An actuating finger 106 is provided. The actuating finger has a pivotal end. The pivotal end of the actuating finger has a pivot pin 108. The pivot pin is coupled to an intermediate extent of the handle. The finger also has a free end. The free end of the finger has a slot 110. The slot contacts the nut. The finger is adapted to be depressed by a user. In this manner the drive rod is moved. Further in this manner the pressure plate is moved from the upper orientation to the lower orientation.

An inverted U-shaped spacer 114 is provided. The spacer is positionable between the circular disk and the pusher plate. In this manner the thickness of a hamburger patty being formed by the system may be reduced.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A handheld hamburger patty forming system comprising:
    a housing having a cylindrical side wall with an upper end and an open lower end;
    a circular disk closing the upper end, the circular disk having a central aperture;
    a circular pusher plate reciprocable within the housing between a raised orientation adjacent to the circular disk and a lowered orientation;
    a drive rod having lower and upper ends and a central extent extending through the aperture, the upper end being spaced above the circular disk, the drive rod having threads at its upper end, a nut removably coupled to the upper end;
    a handle having an interior end fixedly attached directly to the upper end of the cylindrical side wall of the housing and an exterior end extending away from the housing;
    a coil spring encompassing the central extent of the drive rod with a bottom end contacting the circular disk and with a top end contacting the nut, the coil spring being adapted to urge the pusher plate to a raised orientation whereat the housing is adapted to be filled with ground meat formed into a hamburger patty with a fixed height and a fixed diameter, the nut adapted to be pushed by the user to move the pusher plate to a lowered orientation for ejecting a perfectly formed hamburger patty ready for cooking; and
    an actuating finger having a pivotal end coupled to an intermediate extent of the handle, the finger also having a free end contacting the nut, the finger adapted to be depressed by a user to move the drive rod and pusher plate from the upper orientation to the lower orientation.

2. A handheld hamburger patty forming system (10) for shaping ground meat into perfectly formed patties, the system comprising, in combination:
    a housing (14) having a cylindrical side wall (16) with an open lower end (18) and an upper end (20), a flat circular disk (22) closing the upper end, a chamber (24) within the side wall and bounded by the upper and lower ends, the circular disk having a central aperture (26);
    a circular pusher plate (30) having a lower surface (32) and an upper surface (34), the pusher plate being rigid with a thickness of between 0.25 inches and 0.125 inches and a diameter of between 3.75 inches and 3.875 inches, the pusher plate being positioned within the chamber for reciprocal movement between a raised orientation with the upper surface adjacent to the circular disk and a lowered orientation with the lower surface co-planar with the lower end of the housing, the chamber between the lower end of the side wall and the pusher plate having a diameter of 4.0 inches, plus or minus 10 percent, and an axial length of 1.0 inch, plus or minus 10 percent;
    a drive rod (38) having an upper end (40) and a lower end (42) and a central extent extending through the aperture of the circular disk, the lower end of the drive rod being coupled to the upper surface of the pusher plate, the upper end of the drive rod being threaded and spaced above the circular disk, an acorn nut (44) removably coupled to the threaded upper end of the drive rod;
    a handle (50) having an interior end fixedly attached directly to the upper end of the cylindrical side wall of the housing and an exterior end extending away from the housing and adapted to be held by a user during operation and use; and
    a coil spring (54) encompassing the central extent of the drive rod, the coil spring having a bottom end (56) adjacent to the circular disk, the coil spring having a top end (58) contacting the acorn nut, the coil spring urging the pusher plate to the raised orientation whereat the chamber is adapted to be filled with ground meat formed into a half pound hamburger patty about 4 inches in diameter and about 1 inch high, the acorn nut adapted to be pushed by the user to move pusher plate to the lowered orientation for ejecting a perfectly formed half pound hamburger patty ready for cooking.

3. The system as set forth in claim 2 and further including:
    an inverted U-shaped spacer (114) positionable between the circular disk and the pusher plate to reduce the thickness of a hamburger patty being formed by the system.

* * * * *